United States Patent [19]
Ehret et al.

[11] Patent Number: 5,371,677
[45] Date of Patent: Dec. 6, 1994

[54] METHOD FOR DETERMINING THE SLIP ANGLES AND/OR THE CORNERING FORCES OF A BRAKED VEHICLE

[75] Inventors: Thomas Ehret, Seelbach; Uwe Hartmann, Stuttgart; Albert Lutz, Marbach/Neckar, all of Germany

[73] Assignee: Robert Bosch GmbH, Stuttgart, Germany

[21] Appl. No.: 859,394

[22] PCT Filed: Sep. 26, 1991

[86] PCT No.: PCT/EP91/01841

§ 371 Date: May 27, 1992

§ 102(e) Date: May 27, 1992

[87] PCT Pub. No.: WO92/05987

PCT Pub. Date: Apr. 16, 1992

[30] Foreign Application Priority Data

Sep. 28, 1990 [DE] Germany .................. 4030653

[51] Int. Cl.⁵ .................. B60T 8/32; B60T 8/64
[52] U.S. Cl. .................. 364/426.02; 303/93; 303/108
[58] Field of Search .......... 364/426.01, 426.02; 303/93, 108, 100

[56] References Cited

U.S. PATENT DOCUMENTS

| | | | |
|---|---|---|---|
| 4,779,696 | 10/1988 | Harada et al. | 364/426.01 |
| 4,794,539 | 12/1988 | Wallentowitz et al. | 364/426.01 |
| 4,809,181 | 2/1989 | Ito et al. | 364/426.01 |
| 4,862,368 | 8/1989 | Kost et al. | 364/426.01 |
| 5,001,636 | 3/1991 | Shiraishi et al. | 180/142 |
| 5,040,115 | 8/1991 | Fukushima et al. | 364/426.01 |

FOREIGN PATENT DOCUMENTS

| | | |
|---|---|---|
| 0152602 | 8/1985 | European Pat. Off. . |
| 0331203 | 9/1989 | European Pat. Off. . |
| 3300640 | 7/1984 | Germany . |
| 3500793 | 7/1985 | Germany . |
| 3734477 | 4/1988 | Germany . |
| 3919347 | 2/1990 | Germany . |
| 3923599 | 2/1990 | Germany . |
| 4010332 | 10/1990 | Germany . |
| 3935588 | 4/1991 | Germany . |
| WO90/06251 | 6/1990 | WIPO . |
| 9006251 | 6/1990 | WIPO . |

*Primary Examiner*—Thomas G. Black
*Assistant Examiner*—Tyrone V. Walker
*Attorney, Agent, or Firm*—Spencer, Frank & Schneider

[57] ABSTRACT

A method is described for determining the slip angles $\alpha_i$ and/or the cornering forces $F_S$ of a braked vehicle. Starting from a simplified vehicle model and using the wheel speeds $V_{Ri}$, the steering angle $\beta$, the yaw rate $\phi$ and the master brake cylinder pressure $P_{HB2}$ or the wheel brake pressure $P_i$ as measured variables, the desired variables are determined as estimated variables.

6 Claims, 12 Drawing Sheets

METHOD FOR DETERMINING THE SLIP ANGLES AND/OR THE CORNERING FORCES OF A BRAKED VEHICLE

PRIOR ART

The slip angles of the wheels or of the axles of a braked motor vehicle are important variables for the vehicle dynamics control of a motor vehicle. This also applies to the cornering forces on the individual wheels. The two variables can be measured directly or determined only with difficulty.

SUMMARY OF THE INVENTION

The invention proposes an estimate of the above mentioned two variables, i.e., the slip angles and the cornering forces there being included in the estimate measured variables which are required in any case for vehicle dynamics control, and are therefore measured.

The present invention generally provides a method for increasing the controllability of a wheeled vehicle having a dynamic drive control system for controlling at least the brake pressure of the wheels, and including the steps of determining slip angle values $\alpha_i$, where $i=1, \ldots 4$ and indicates the respective vehicle wheel, and applying the determined slip angle values $\alpha_i$ to the dynamic drive control system to improve the vehicle control; and wherein the step of determining the slip angle values $\alpha_i$ comprises: determining respective wheel speeds $V_{Ri}$, the steering angle $\delta$, the vehicle yaw rate $\rho$ and respective wheel brake cylinder pressures $P_{Ri}$; calculating braking forces $F_{Bi}$ from the wheel brake pressures $P_{Ri}$ according to the equation $$F_{Bi} = \frac{\theta R}{R^2} V_{Ri} + \frac{C_{Pi}}{R} P_{Ri},$$

where $\theta R$ is the amount of inertia of the wheel, $C_{Pi}$ is the braking ratio, and $R$ is the radius of the wheel; determining the longitudinal vehicle speed $V_L$ from the wheel speeds $V_{Ri}$ and from the deceleration of the vehicle; estimating the vehicle transverse speed $V_q$ from the determined values for $\delta_i$ and $\rho$ using a Kalman Filter; estimating the attitude angles $\beta_V$ and $\beta_H$ from the estimated value $V_q$ of the vehicle transverse speed $V_q$, according to the relationships $$\beta_V = \frac{V_q - l_1 \rho}{V_L} \text{ and } \beta_H = -\frac{V_q + l_2 \rho}{V_L},$$

where V and H indicate the front and rear, respectively, and where $l_1$ and $l_2$ are the respective lengths of the vehicle axles from the vehicle center of gravity; and determining the slip angles $\alpha_i$, using the estimated attitude angle values $\beta_V$ and $\beta_H$ and values $\delta E_i$ corresponding the respective elastic steering angle values, according to the relationships $$\alpha_1 = \delta - \beta_V - \delta_{E1}$$

$$\alpha_2 = \delta - \beta_V - \delta_{E2}$$

$$\alpha_3 = \beta_H - \delta_{E3}$$

$$\alpha_4 = \beta_H - \delta_{E4}$$

According to the preferred embodiment of the invention at least the wheel speeds $V_{Ri}$, the steering angle $\delta$ and the yaw rate $\rho$ are measured or determined from measured values of the master brake cylinder pressure. The wheel brake cylinder pressures $P_{Ri}$ maybe measured. Moreover, preferably the cornering forces $F_{Si}$ on the respective wheels are determined using the estimated attitude angle values $\beta_V$ and $\beta_H$ and the steering angle $\delta$ and the determined cornering forces $F_{Si}$ are applied to the dynamic drive control system to further improve the controllability of the vehicle.

DETAILED DESCRIPTION OF THE PREFERRED EMBODIMENT

Figure 1A:
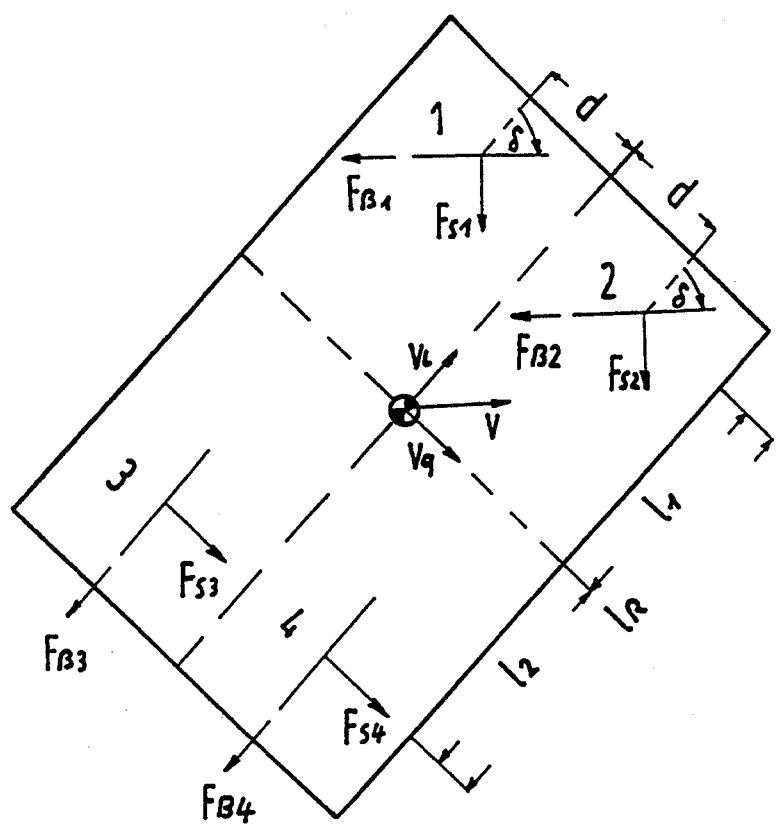
FIGS. 1a and 1b are simplified vehicle models used to explain the present invention.
Figure 1B:
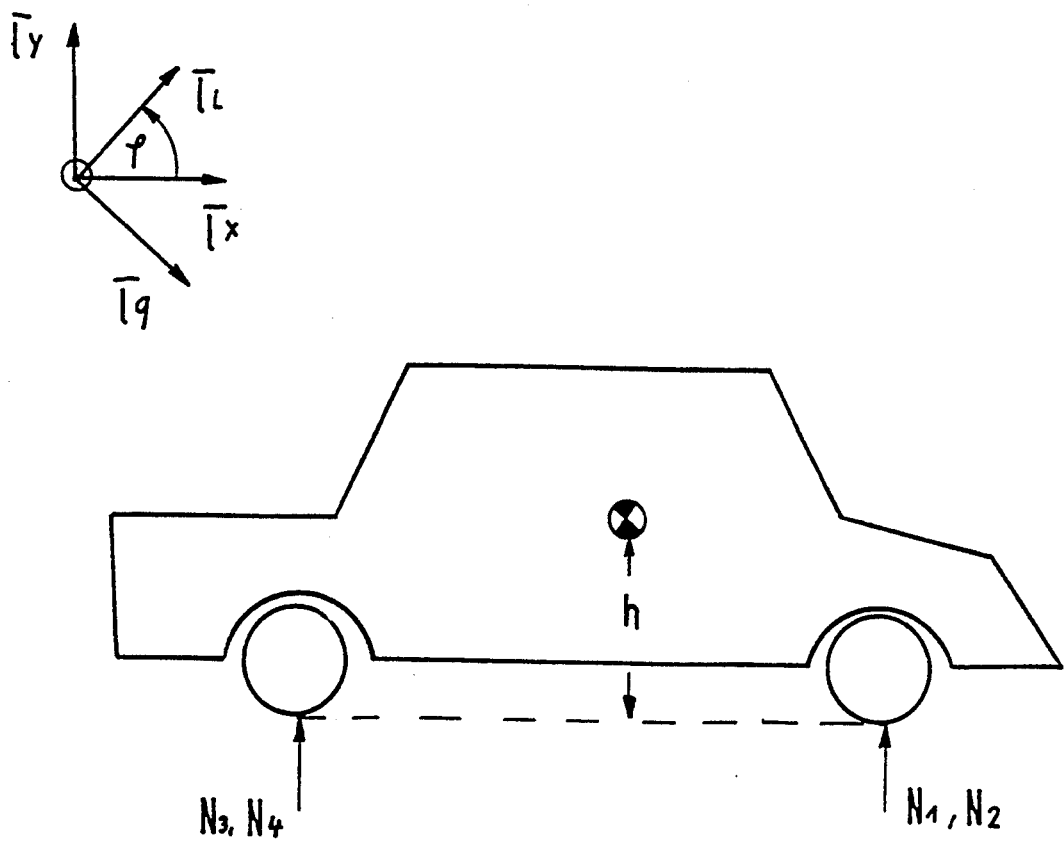
Figure 2A:
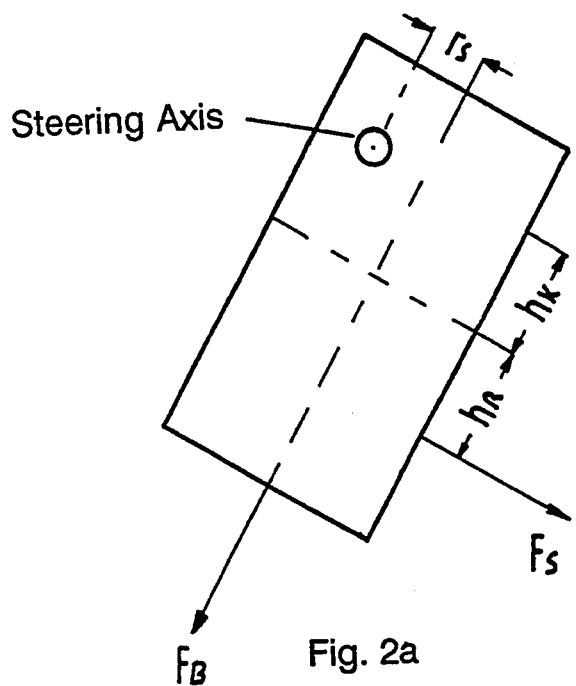
FIGS. 2a, 2b and 3 are further diagrams used in explaining the present invention.
Figure 2B:
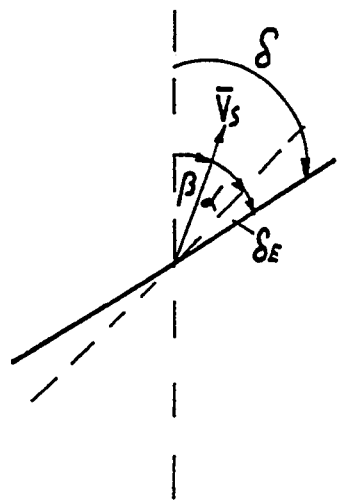

The point of departure for the further considerations is the simple vehicle model sketched in FIGS. 1a and 1b, in which the pitching, rolling and up-and-down motion are not taken into account. Using these simplifications, the theorems of momentum and angular momentum yield the following equations:

Momentum theorem $$m(\dot{V}_L + V_q \phi) = F_{SV} \sin \delta + F_{BV} \cos \delta + F_{BH}) \quad (1.1)$$

$$m(\dot{V}_q - V_L \phi) = F_{SV} \cos \delta - F_{BV} \sin \delta + F_{SH} \quad (1.2)$$

$$N_1 + N_2 + N_3 + N_4 - mg = 0 \quad (1.3)$$

Angular momentum theorem $$[F_{BV} l_1 + (F_{S1} - F_{S2})d]\sin\delta - [(F_{B1} - F_{B2})d - F_{SV} l_1]\cos\delta + \quad (1.4)$$

$$F_{SH} l_2 + (F_{B3} - F_{B4})d = \theta_H \dot\phi$$

where
$F_{SV} = F_{S1} + F_{S2}$
$F_{SH} = F_{S3} + F_{S4}$
$F_{BV} = F_{B1} + F_{B2}$ $F_{BH} = F_{B3} + F_{B4}$ here m is the vehicle mass
$\theta_H$ is the moment of inertia about the vertical axis
g is the acceleration due to gravity
$V_L$ is the longitudinal vehicle speed
$V_q$ is the transverse vehicle speed at the centre of gravity
$\phi$ is the yaw rate about the vertical axis
$F_{Si}$ is the cornering force of the i-th wheel
$F_{Bi}$ is the braking force of the i-th wheel
$\delta$ is the steering angle
$N_i$ is the normal force of the i-th wheel
$l_1$, $l_2$ are axle distances from the centre of gravity
d is the wheel distance from the longitudinal axis, and
h is the height of the centre of gravity Apart from equations (1.3), 1.5), and (1.6), the definite determination of the normal forces $N_1, \ldots, N_4$ requires a further relationship, which is obtained by taking account of the vehicle compression. It holds for small compressions $X_1, \ldots X_4$ that:

$$X_1 + X_4 = X_2 + X_3 \tag{1.7}$$

Assuming that the spring constants of the wheel suspensions are equal, it follows that:

$$N_1 + N_4 = N_2 + N_3 \tag{1.8}$$

In the stationary state, it holds for the moments above the steering axis, which for the sake of simplicity is assumed to be perpendicular to the plane of the drawing, that:

$$F_S(n_R + n_K) - F_B r_S - C_{AS}\delta_E = 0 \tag{2.1}$$

The cornering force and braking force are calculated in accordance with the HSRI tire model:

$$F_S = \frac{C_\alpha}{1-\lambda}\left(\frac{1}{H} - \frac{1}{4H^2}\right)\tan\alpha \tag{2.2}$$

$$F_B = \frac{C_\lambda \cdot \lambda}{1-\lambda}\left(\frac{1}{H} - \frac{1}{4H^2}\right) \tag{2.3}$$

Here, $r_S$ is the steering offset
$n_K$ is the kinematic trailing
$n_R$ is the tire trailing
$\delta$ is the steering angle
$\delta_E$ is the elastic steering angle
$\beta$ is the attitude angle
$\alpha$ is the slip angle
$V_x$ is the speed of the centre of gravity of the wheel
$C_{AS}$ is the resultant axle and steering stiffness
and $$H = \sqrt{\left(\frac{C_\lambda \cdot \lambda}{\mu \cdot N(1-\lambda)}\right)^2 + \left(\frac{C_\alpha \cdot \tan\alpha}{\mu N(1-\lambda)}\right)^2}$$

follows from equations (2.2) and (2.3) that:

$$\frac{F_S}{F_B} = \frac{C_\alpha}{C_\lambda}\frac{\tan\alpha}{\lambda} \tag{2.4}$$

$C_\alpha$ is the slip stiffness of the tire
$C_\lambda$ is the tire longitudinal stiffness
$\lambda$ is the tire slip
$\mu$ is the coefficient of friction, and
N is the normal force It follows from equation (2.4), using the approximation $\tan\alpha \approx \alpha$, that $$F_S = \frac{C_\alpha}{C_\lambda}\frac{F_B}{\lambda}\alpha \tag{2.5}$$

or, with $$\alpha = \delta - \beta - \delta_E \text{ in accordance with FIG. } 2b \tag{2.6}$$

$$F_S = \frac{C_\alpha}{C_\lambda}\frac{F_B}{\lambda}(\delta - \beta - \delta_E) \tag{2.7}$$

It follows from equation (2.1) and (2.7) that:

$$\delta_E = \frac{\frac{C_\alpha}{C_\lambda}\frac{F_B}{\lambda}l_E}{C_{AS} + \frac{C_\alpha}{C_\lambda}\frac{F_B}{\lambda}l_E}(\delta - \beta) - \frac{F_B r_S}{C_{AS} + \frac{C_\alpha}{C_\lambda}\frac{F_B}{\lambda}l_E} \tag{2.8}$$

$$F_S = \frac{C_{AS}\frac{C_\alpha}{C_\lambda}\frac{F_B}{\lambda}}{C_{AS} + \frac{C_\alpha}{C_\lambda}\frac{F_B}{\lambda}l_E}(\delta - \beta) + \frac{\frac{C_\alpha}{C_\lambda}\frac{F_B^2}{\lambda}r_S}{C_{AS} + \frac{C_\alpha}{C_\lambda}\frac{F_B}{\lambda}l_E} \tag{2.9}$$

where $1^E = n_R + n_K$.

Starting from the fundamental equations (2.6), (2.8) and (2.9), the elastic steering angle $\alpha_E$ the slip angle $\alpha$ and the cornering forces $F_{Si}$ of the four wheels are yielded as:

$$\delta_{E1} = \tag{2.10}$$

$$\frac{\frac{C_\alpha}{C_\lambda}\frac{F_{B1}}{\lambda_1}l_{EV}}{C_{AS} + \frac{C_\alpha}{C_\lambda}\frac{F_{B1}}{\lambda_1}l_{EV}}(\delta - \beta_V) - \frac{F_{B1}r_{SV}}{C_{AS} + \frac{C_\alpha}{C_\lambda}\frac{F_{B1}}{\lambda_1}l_{EV}}$$

$$\delta_{E2} = \tag{2.11}$$

$$\frac{\frac{C_\alpha}{C_\lambda}\frac{F_{B2}}{\lambda_2}l_{EV}}{C_{AS} + \frac{C_\alpha}{C_\lambda}\frac{F_{B2}}{\lambda_2}l_{EV}}(\delta - \beta_V) + \frac{F_{B2}r_{SV}}{C_{AS} + \frac{C_\alpha}{C_\lambda}\frac{F_{B2}}{\lambda_2}l_{EV}}$$

$$\delta_{E3} = \frac{\frac{C_\alpha}{C_\lambda}\frac{F_{B3}}{\lambda_3}l_{EH}}{C_A + \frac{C_\alpha}{C_\lambda}\frac{F_{B3}}{\lambda_3}l_{EH}}\beta_H - \frac{F_{B3}r_{SH}}{C_A + \frac{C_\alpha}{C_\lambda}\frac{F_{B3}}{\lambda_3}l_{EH}} \tag{2.12}$$

$$\delta_{E4} = \frac{\frac{C_\alpha}{C_\lambda}\frac{F_{B4}}{\lambda_4}l_{EH}}{C_A + \frac{C_\alpha}{C_\lambda}\frac{F_{B4}}{\lambda_4}l_{EH}}\beta_H + \frac{F_{B4}r_{SH}}{C_A + \frac{C_\alpha}{C_\lambda}\frac{F_{B4}}{\lambda_4}l_{EH}} \tag{2.13}$$

The following abbreviations are used herein:

$$C_{V1} = \frac{C_{AS}\frac{C_\alpha}{C_\lambda}\frac{F_{B1}}{\lambda_1}}{C_{AS} + \frac{C_\alpha}{C_\lambda}\frac{F_{B1}}{\lambda_1}l_{EV}} \; ; \; u_1 = \frac{\frac{C_\alpha}{C_\lambda}\frac{F_{B1}^2}{\lambda_1}r_{SV}}{C_{AS} + \frac{C_\alpha}{C_\lambda}\frac{F_{B1}}{\lambda_1}l_{EV}} \quad (2.22)$$

$$C_{V2} = \frac{C_{AS}\frac{C_\alpha}{C_\lambda}\frac{F_{B2}}{\lambda_2}}{C_{AS} + \frac{C_\alpha}{C_\lambda}\frac{F_{B2}}{\lambda_2}l_{EV}} \; ; \; u_2 = \frac{\frac{C_\alpha}{C_\lambda}\frac{F_{B2}^2}{\lambda_2}r_{SV}}{C_{AS} + \frac{C_\alpha}{C_\lambda}\frac{F_{B2}}{\lambda_2}l_{EV}} \quad (2.23)$$

$$C_{V3} = \frac{C_A\frac{C_\alpha}{C_\lambda}\frac{F_{B3}}{\lambda_3}}{C_A + \frac{C_\alpha}{C_\lambda}\frac{F_{B3}}{\lambda_3}l_{EH}} \; ; \; u_3 = \frac{\frac{C_\alpha}{C_\lambda}\frac{F_{B3}^2}{\lambda_3}r_{SH}}{C_A + \frac{C_\alpha}{C_\lambda}\frac{F_{B3}}{\lambda_3}l_{EH}} \quad (2.24)$$

$$C_{V4} = \frac{C_A\frac{C_\alpha}{C_\lambda}\frac{F_{B4}}{\lambda_4}}{C_A + \frac{C_\alpha}{C_\lambda}\frac{F_{B4}}{\lambda_4}l_{EH}} \; ; \; u_4 = \frac{\frac{C_\alpha}{C_\lambda}\frac{F_{B4}^2}{\lambda_4}r_{SH}}{C_A + \frac{C_\alpha}{C_\lambda}\frac{F_{B4}}{\lambda_4}l_{EH}} \quad (2.25)$$

Furthermore, we may put:

$$\beta_V \approx \frac{V_q - l_1\phi}{V_L} \; ; \; \beta_H \approx \frac{V_q + l_2\phi}{V_L} \quad (2.26)$$

$$\lambda_1 \approx \frac{V_L\cos\delta - V_{R1}}{V_L\cos\delta} \; ; \; \lambda_2 \approx \frac{V_L\cos\delta - V_{R2}}{V_L\cos\delta} \quad (2.27)$$

$$\lambda_3 \approx \frac{V_L - V_{R3}}{V_L} \; ; \; \lambda_4 \approx \frac{V_L - V_{R4}}{V_L} \quad (2.28)$$

Here, $l_{EV}$ is $(n_R + n_K)_{front\,axle}$
$l_{KH}$ is $(n_R + n_K)_{rear\,axle}$
$V_{Ri}$ are the wheel speeds
$C_{AS}$ is the resultant axle and steering stiffness, front axle
$r_{SV}$ is the steering offset at the front axle
$C_A$ is the resultant axle stiffness, rear axle, and
$r_{SH}$ is the steering offset at the rear axle In these relationships, the longitudinal vehicle speed $V_L$, the transverse vehicle speed $V_q$ and the braking forces $F_{Bi}$ are variables still to be determined, while the steering angle $\delta$, the yaw rate $\phi$ and the wheel speeds $V_{Ri}$ are measured variables. The rest are constants.

Figure 3:
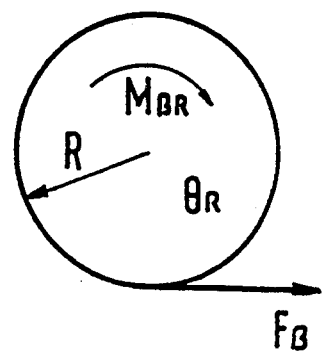

Applying the angular momentum theorem in accordance with FIG. 3 yields the relationship:

$$\theta_R \frac{V_R}{R} = F_B R - M_{BR} \quad (3.1)$$

where $M_{HR} = C_P P_R$, and
$\theta_R$ is the moment of inertia of the wheel
$C_P$ is the braking torque ratio
$P_R$ is the wheel brake cylinder pressure
$M_{HR}$ is the braking torque, and
$R$ is the radius of the wheel The braking force of the i-th wheel is thus yielded as:

$$F_{Bi} = \frac{\theta_R}{R^2} V_{Ri} + \frac{C_{Pi}}{R} P_{Ri}, i = 1, \ldots, 4 \quad (3.3)$$

The wheel brake cylinder pressures can be estimated in a known way from the measured inlet pressure (master brake cylinder pressure) in conjunction with a hydraulic model, or can be directly measured.

The longitudinal vehicle speed is obtained from the wheel signals and the estimated vehicle retardation:

$$a_L \approx -\frac{1}{m}\sum_{i=1}^{4} F_{Bi} \quad (3.4)$$

Substituting equations (2.18)–(2.21) in equations (1.2) and (1.4) yields the relationships:

$$m(\dot{V}_q - V_L\phi) = C_V\cos\delta(\delta - \beta_V) + C_H\beta_H + u_5 \quad (4.1)$$

$$\theta_H\dot{\phi} = -[C_Vl_1\cos\delta - (C_{V1} - C_{V2})d\sin\delta](\delta - \beta_V) + \quad (4.2)$$

$$C_Hl_2\beta_H + u_6$$

where $u_5 = \cos\delta(u_1 + u_2) + u_3 + u_4 - F_{VB}\sin\delta$
$u_6 = F_B\nu l_1\sin\delta + (F_{B1} - F_{B2})d\cos\delta + (F_{B3} - F_{B4})d +$ $$(u_1 - u_2)d\sin\delta - (u_1 + u_2)l_1\cos\delta + l_2(u_3 + u_4)$$
$C_V = C_{V1} + C_{V2}$
$C_H + C_{V3} + C_{V4}$ Finally, substituting equation (2.26) in equations (4.1) and (4.2) yields the system of differential equations:

$$\dot{V}_q \approx A_{11}V_q + A_{12}\phi + u_1 \quad (4.3)$$
$$\dot{\phi} = A_{21}V_q + A_{22}\phi + u_2 \quad (4.4)$$

Equations (4.3) and (4.4) represent a simple, linear time-variant vehicle model.

Introducing the state variables $X_1 = V_q$ and $X_2 = \phi$, and replacing $\dot{X}_{iK}$ by the approximation $$\dot{X}_{iK} = \frac{X_{iK+1} - X_{iK}}{T},$$

where $i = 1, 2$ and

T is the scanning time, yields the discrete state space model:

$$X_{K+1} = \Psi_K X_K + U_K \quad (4.5)$$

where $$\Psi_K = \begin{bmatrix} \Psi_{11} & \Psi_{12} \\ \Psi_{21} & \Psi_{22} \end{bmatrix}_K = \begin{bmatrix} A_{11}T + 1 & A_{12}T \\ A_{21}T & A_{22}T + 1 \end{bmatrix}_K$$

$$A_K = \begin{bmatrix} A_1 \\ A_2 \end{bmatrix}_K = \begin{bmatrix} T \cdot u_1 \\ T \cdot u_2 \end{bmatrix}_K$$

Since $\phi$ is measured, the model (4.5) can be reduced to the order one. It holds that:

$$X_{1K+1} = \Psi_{11K}X_{1K} + u_K \quad (4.6)$$
$$Y_K = \Psi_{21K}X_{1K}^*$$
where
$$Y_K = \phi_K(2 - \Psi_{22K}) - \phi_{K-1} - u_{2K}$$
$$u_K^* = \Psi_{12K}\phi_K + u_{1K}$$

Taking account of the state noise $V_K$ and the measurement noise $W_K$, (4.6) yields the stochastically disturbed system:

$$X_{1K+1} = \Psi_{11K}X_{1K} + u_K^* + V_K \qquad (4.7)$$
$$Y_K = \Psi_{21K}X_{1K} + W_K$$

from which an estimated value $X_{1K}=V_{qK}$ is obtained by means of a Kalman filter. It then holds for the estimated attitude angle that $$\beta_V = \frac{V_q - l_1\phi}{V_L} \ ; \beta_H = -\frac{V_q + l_2\phi}{V_L} \qquad (4.8)$$

The slip angles and the cornering forces of the four wheels can thus be determined in accordance with equations (2.14)–(2.21).

The mean slip angles at the front axle and at the rear axle, which are required for the vehicle controller, are yielded as:

$$\alpha_V = \frac{\alpha_1 + \alpha_2}{2} \ ; \alpha_H + \frac{\alpha_3 + \alpha_4}{2} \qquad (4.9)$$

It is decisive for the quality of the estimate of the transverse vehicle speed $V_q$ from equation (4.7) that there should already be a good estimated value $X_{10}=V_{q0}$ before braking. Since in the unbraked case the slip stiffness cannot be calculated from equations (2.22)–(2.25), they will initially be taken as constant.

Assuming that the slip stiffnesses of the wheels of one axle are equal, and designating the resultant slip stiffness of the front axle by $C_{V0}$ and the resultant slip stiffness of the rear axle by $C_{H0}$, according to equations (4.3) and (4.4) the differential equation for the unbraked vehicle is $$V_q = a_{11}V_q + a_{12}\phi + u_1 \qquad (4.10)$$
$$\phi = a_{21}V_q + a_{22}\phi + u_2$$
where $$a_{11} = -\frac{(C_{V0}\cos\delta + C_{H0})}{mV_L} \ ; a_{12} = \frac{C_{V0}l_1\cos\delta - C_{H0}l_2mV_L^2}{mV_L}$$

$$a_{21} = \frac{C_{V0}l_1\cos\delta - C_{H0}l_2}{\theta_H V_L} \ ; a_{22} = -\frac{(C_{V0}l_1^2\cos\delta + C_{H0}l_2^2}{\theta_H V_L}$$

$$u_1 = \frac{C_{V0}\cos\delta\delta}{m} \ ; u_2 = -\frac{C_{V0}l_1\cos\delta\delta}{\theta_H}$$

It then holds for the lateral forces on the front and rear axles that:

$$F_{SV} = C_{RV}\alpha_V$$
$$F_{SH} = C_{RH}\alpha_H$$
where $$C_{RV} = 2\left[(C_{RL} - C_{RN})\frac{\alpha_o}{\alpha_V} + C_{RN}\right]$$

$$C_{RH} = 2\left[(C_{RL} - C_{RN})\frac{\alpha_o}{\alpha_H} + C_{RN}\right]$$

$$\frac{\alpha_o}{\alpha_V} = 1 \text{ for}|\alpha_V|<|\alpha_o|; \frac{\alpha_o}{\alpha_H} = 1 \text{ for}|\alpha_H|<|\alpha_o|$$

The gradient $C_{RN}$ is determined by means of a PD control law:

$$C_{RN}=C_{RL}-K_P|\phi_S-\phi_n|-K_D|\phi_S-\phi_n|$$

where $\phi_n$ is the measured yaw angular velocity $$\frac{\phi_S}{K_P, K_D}$$

is the simulated yaw angular velocity, and are gains $>0$

The resulting slip stiffnesses $C_V$, $C_H$ are determined from $C_{RV}$, $C_{RH}$ by means of a simple wheel suspension model.

Figure 11:
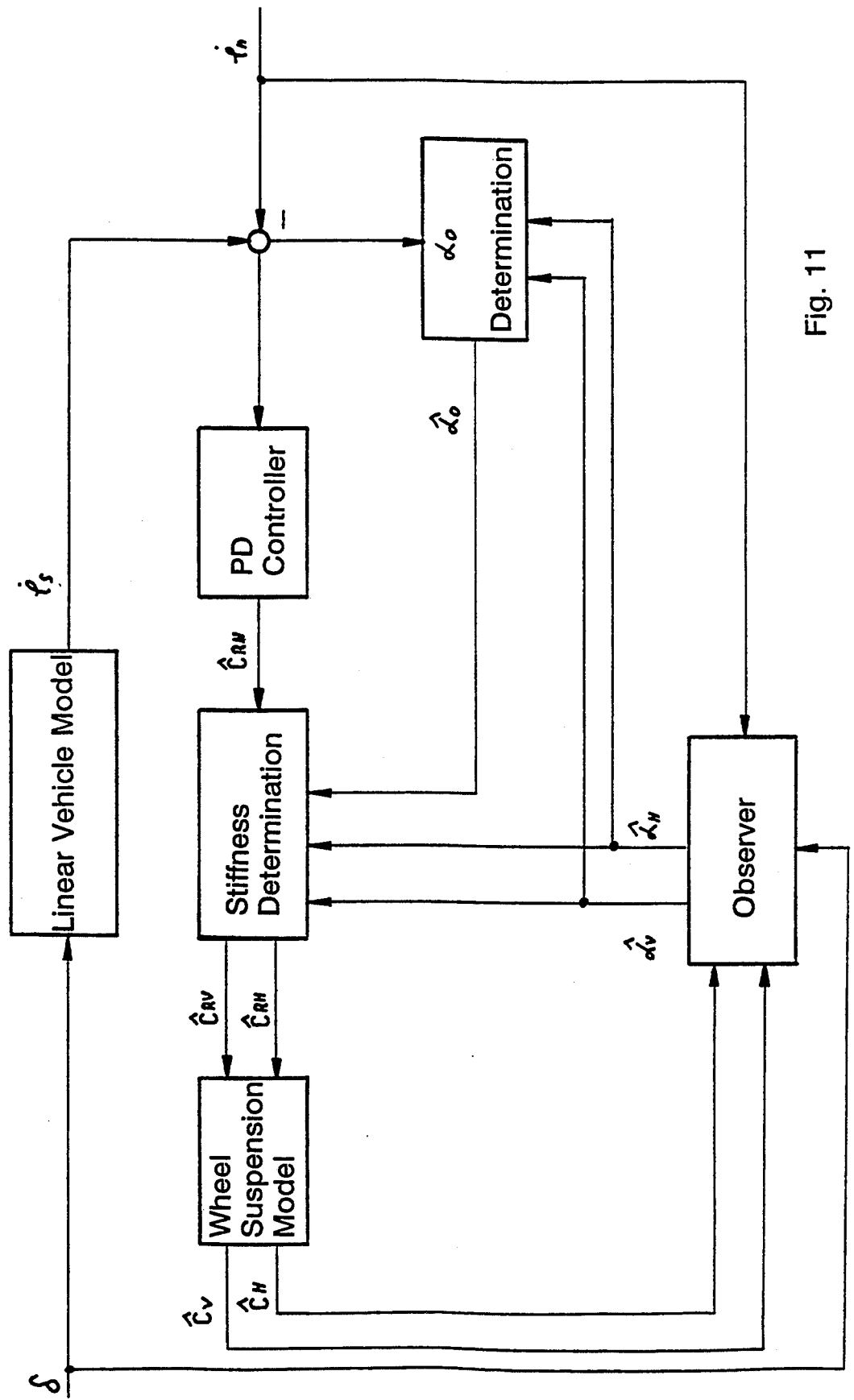
FIG. 11 is a block diagram showing the structure of a slip stiffness controller.

FIG. 11 shows the structure of the "slip stiffness controller".

Figure 12:
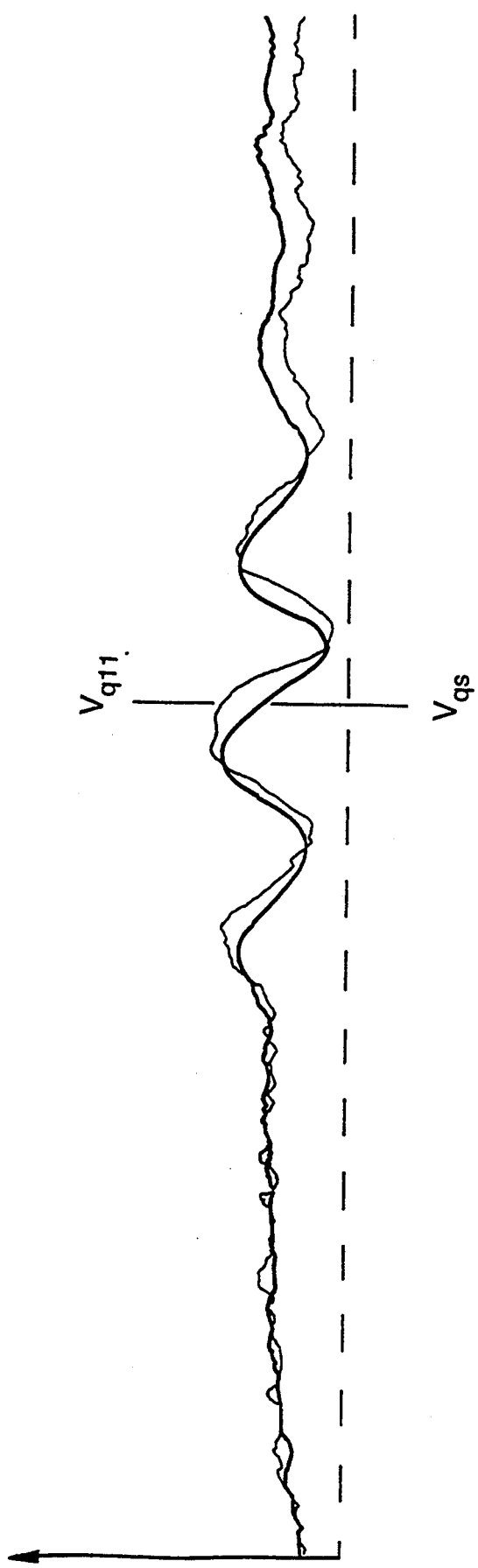
FIG. 12 contains curves showing a comparison between measured and simulated vehicle longitudinal speed using a slip stiffness controller according to FIG. 11.

FIG. 12 shows a comparison between measured and simulated longitudinal vehicle speed using the "slip stiffness-controller".

Figure 8:
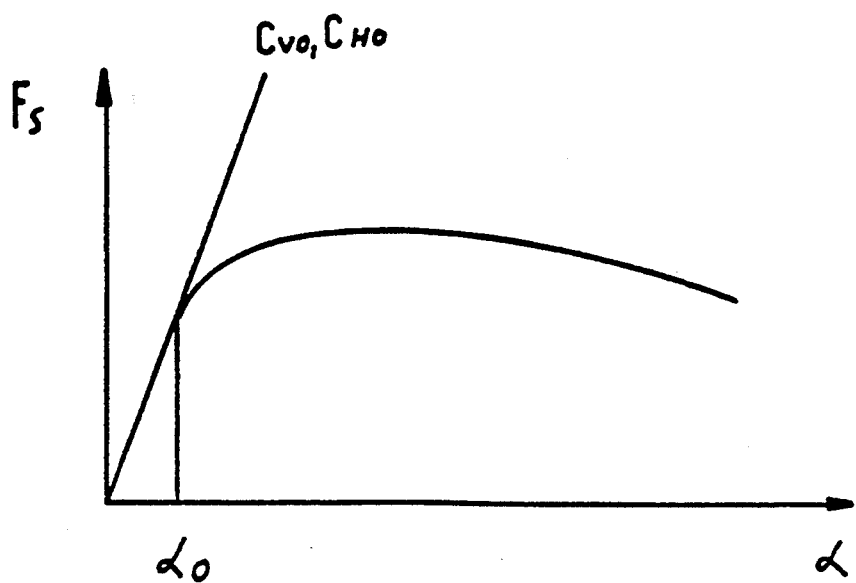
FIG. 8 shows the relationship between the slip angle and the lateral force of a vehicle.

Equations (4.10), however, describe the vehicle behaviour satisfactorily only if the slip angles vary in the linear part of the lateral force/slip curve, that is to say if it holds that $\alpha \leq \alpha_o$ (see FIG. 8).

Figure 9:
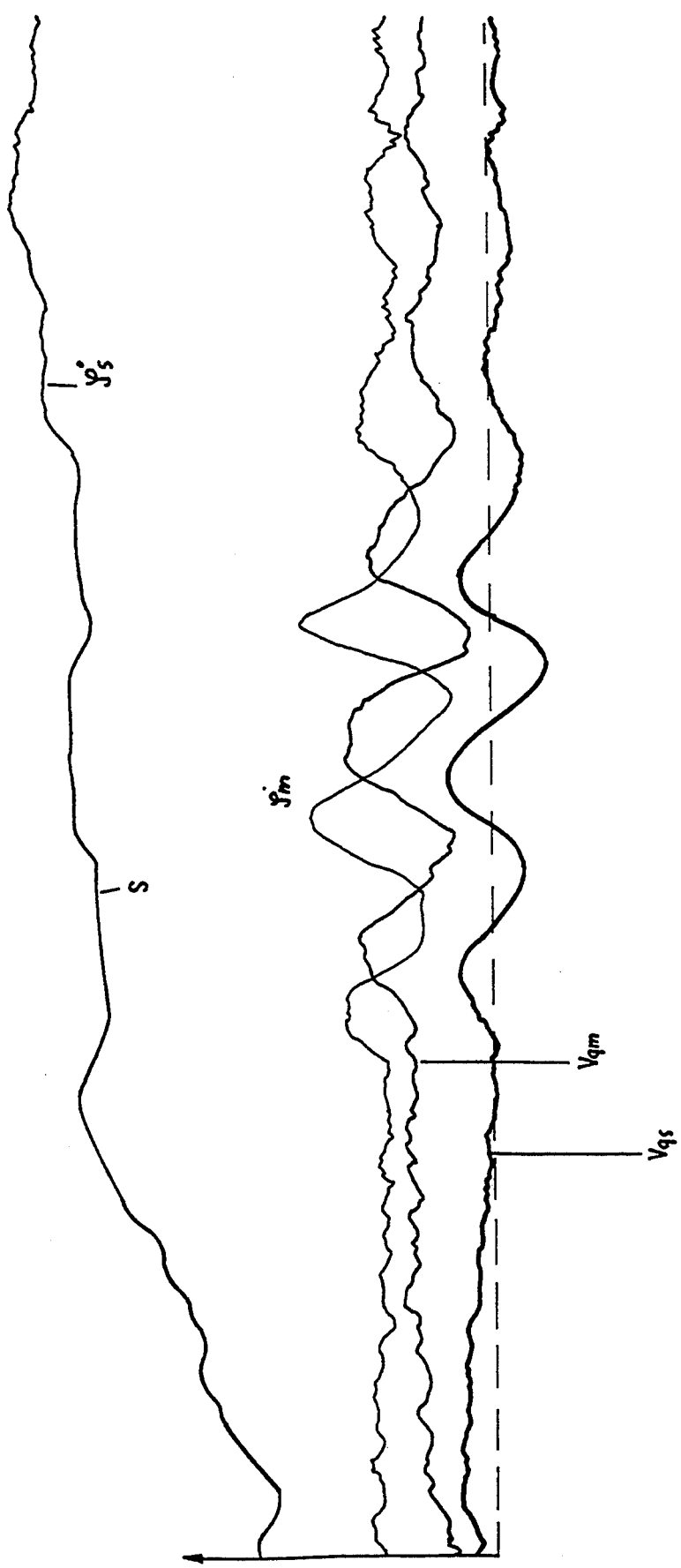
FIG. 9 shows a group of curves illustrating the relationship between the actual and simulated vehicle speed and between the actual and simulated yaw angular velocity when the slip angle is in the non-linear region of the lateral force/slip curve of FIG. 8.

If the slip angle is in the non-linear region of the lateral force/slip curve ($\alpha > \alpha_o$), serious differences arise between the actual and simulated vehicle speed, and between the actual and simulated yaw angular velocity (see FIG. 9).

Figure 10:
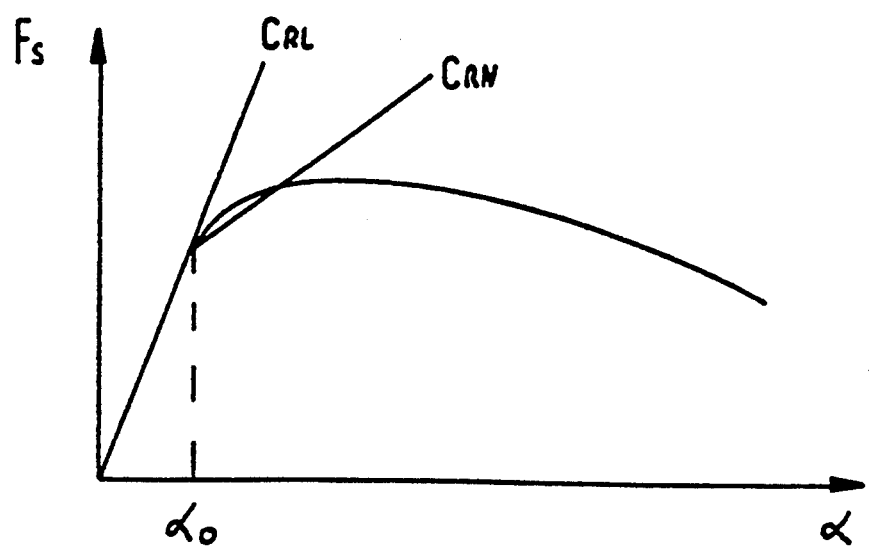
FIG. 10 is a curve illustrating how the difference between the measured and simulated yaw rates can be used, according to a modification of the method according to the invention, to enable to determination of the tire normal forces.

Since the yaw rate is measured, the difference between the measured and simulated yaw rates can be used as an indicator for the transition from the linear to the non-linear region of the lateral force/slip curve. As soon as it is detected that the linear region of the lateral force/slip curve has been left, the connection between the lateral force and slip angle is described approximately by a straight line of gradient $C_{RN}$ (see FIG. 10).

It is now also possible to determine in addition the tire normal forces.

The tire normal forces can be obtained from equations (1.3), (1.5), (1.6) and (1.8). It holds that:

$$N_3 = \frac{mq}{2} + N_2(5.3)$$

$$N_4 = \frac{mq}{2} - N_1 \qquad (5.4)$$

Figure 4:
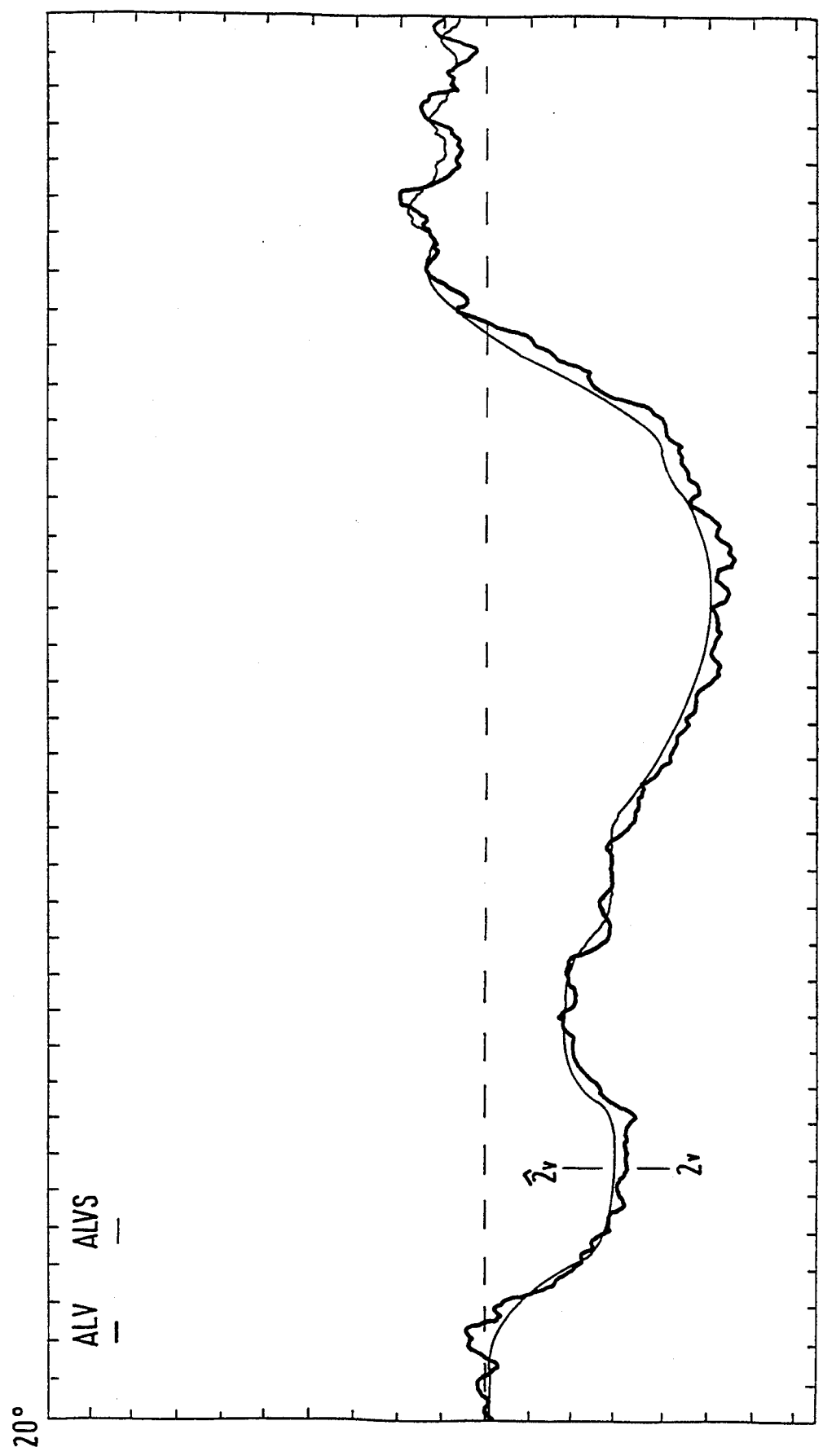
FIGS. 4–7 show a comparison between measured and estimated slip angles of a specific vehicle for various driving maneuvers and different surfaces.
Figure 5:
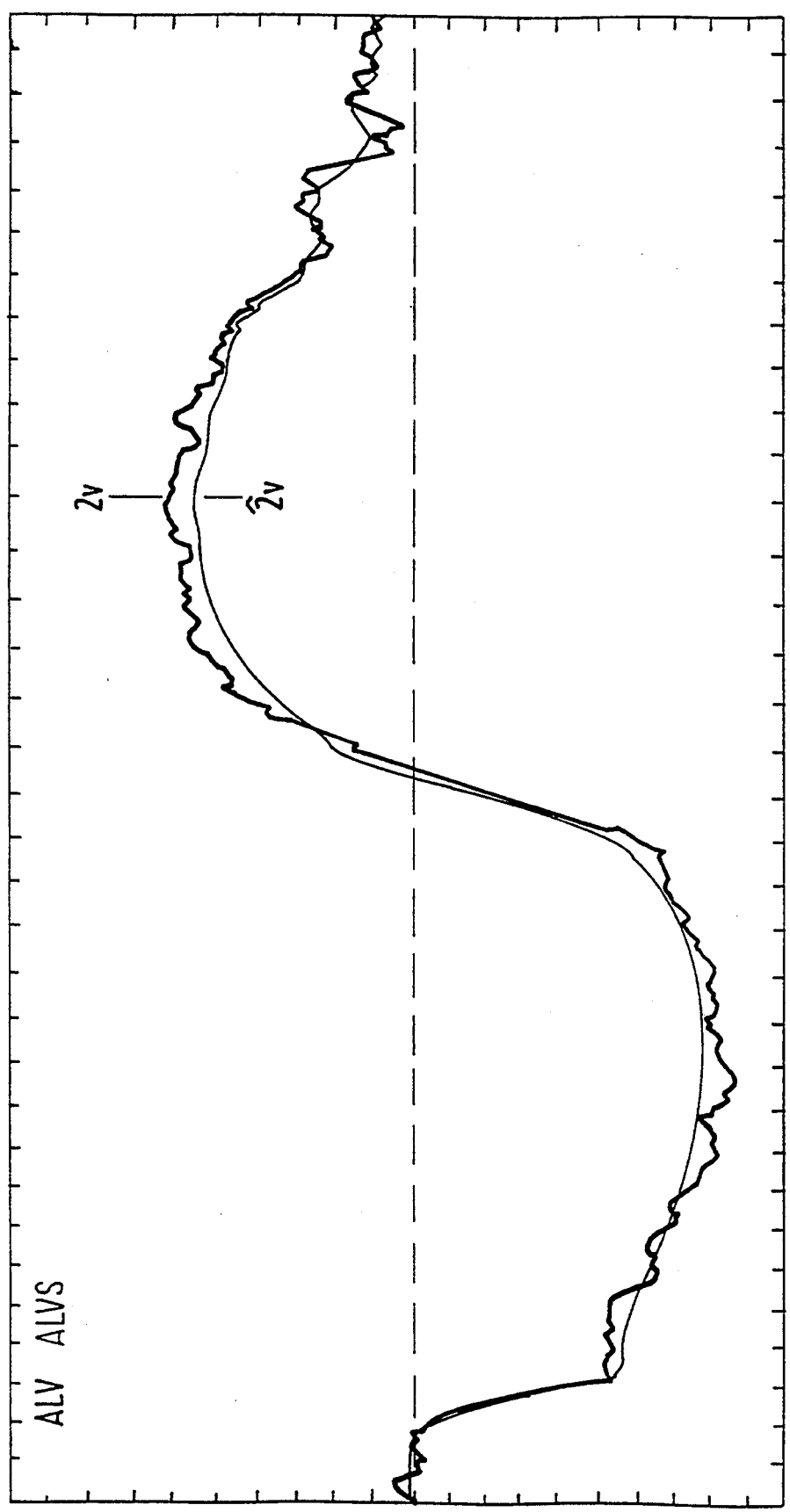
Figure 6:
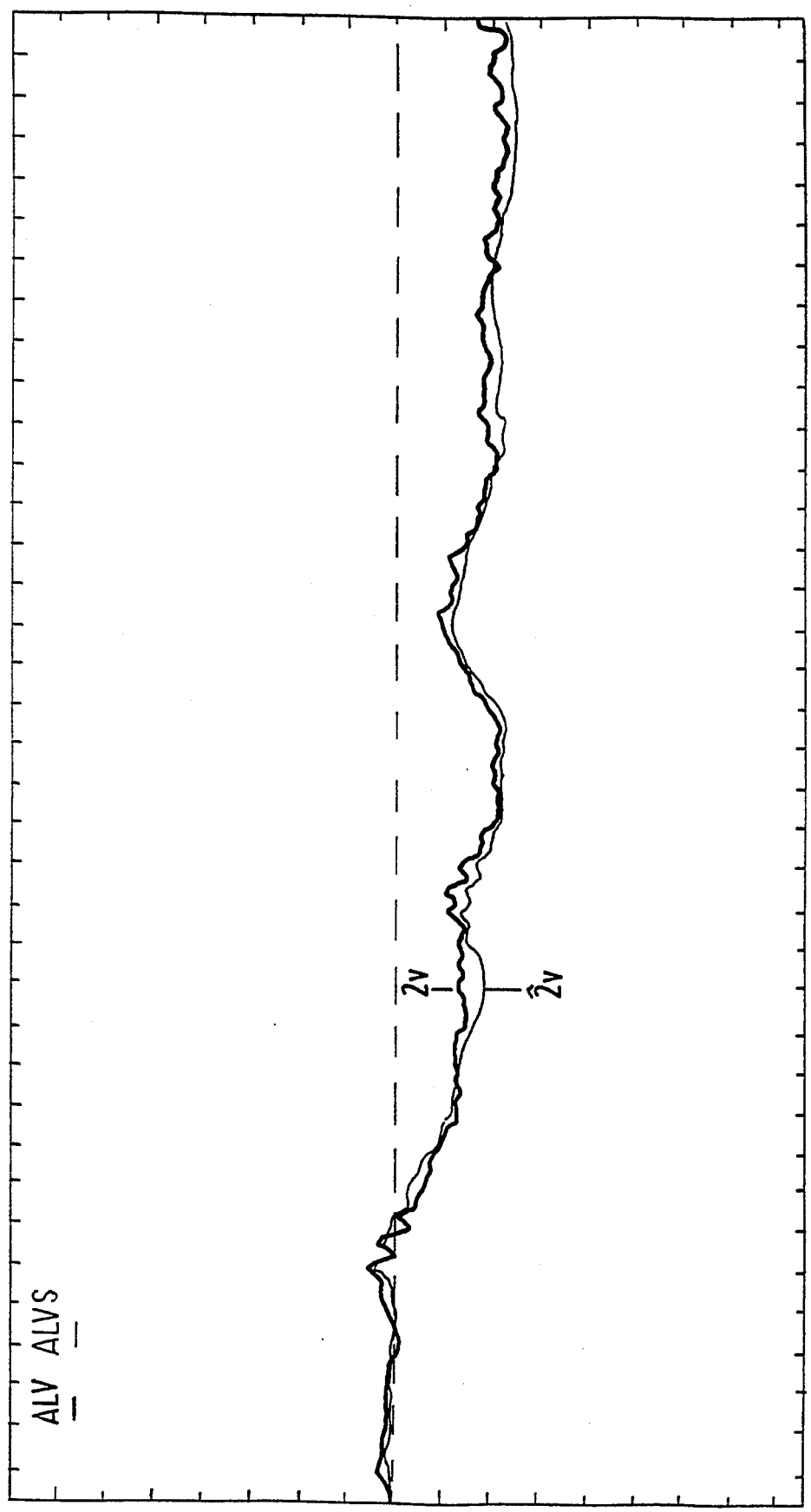
Figure 7:
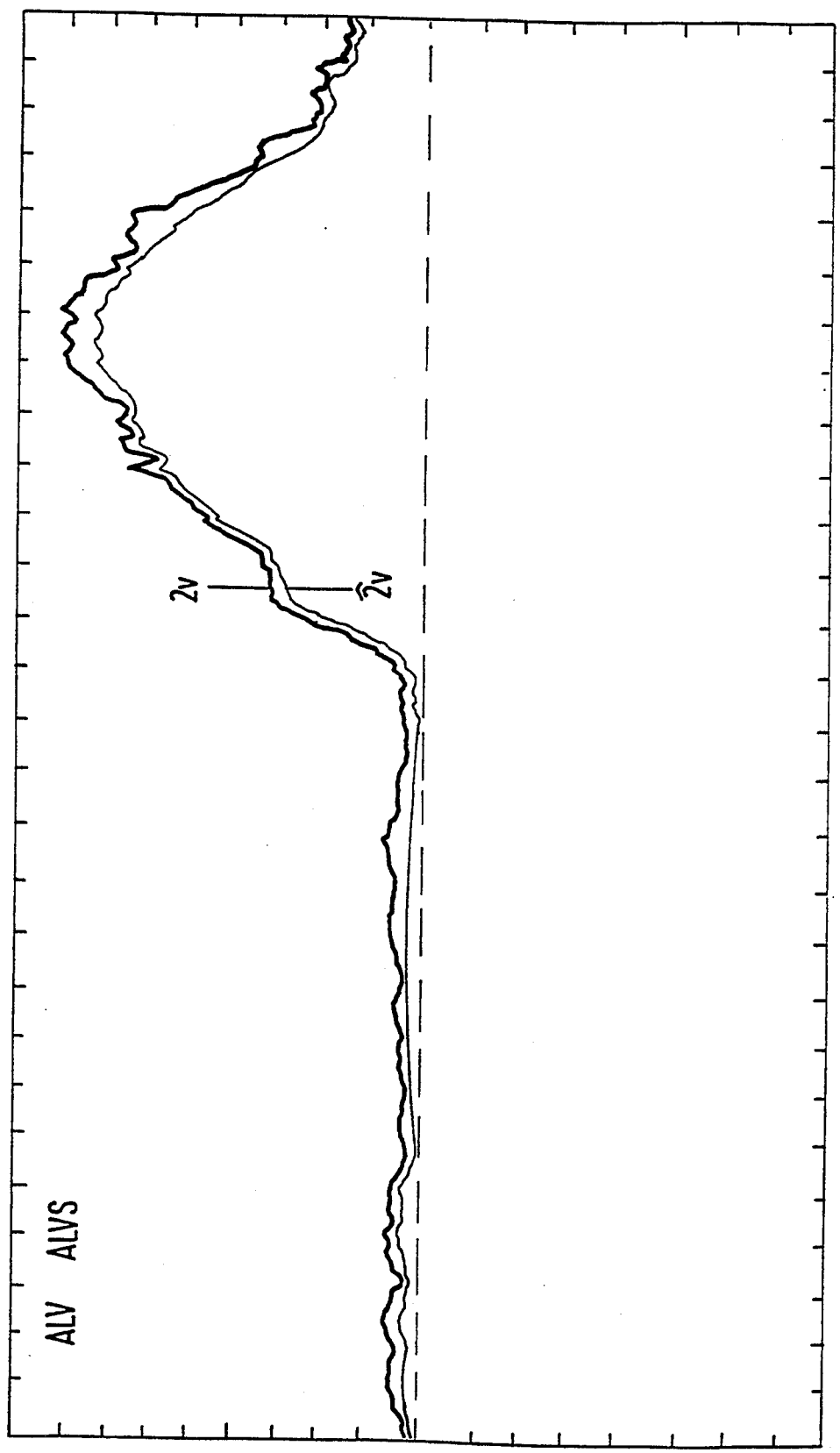
Figure 13:
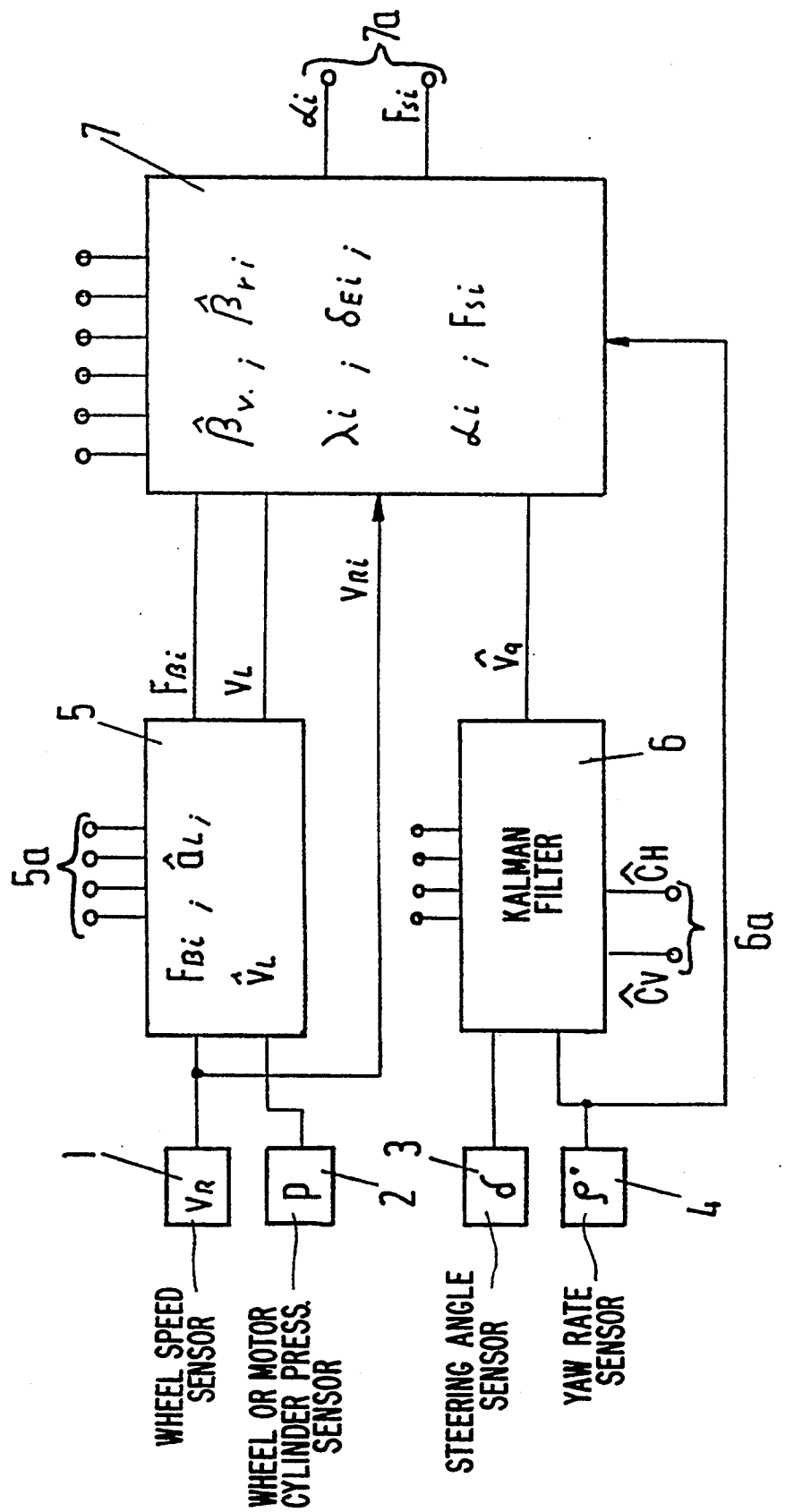
FIG. 13 is a block diagram of an arrangement for carrying out the method according to the invention.

FIGS. 4 to 7 show comparisons between measured ($\alpha_v$) and estimated ($\alpha_v$) slip angles in the case of various driving manoeuvres on different surfaces for a specific vehicle. In detail, FIG. 4 shows driving on ice+curve
FIG. 5 shows driving on ice+evading manoeuvre
FIG. 6 shows driving in the case of $\mu$ split, and
FIG. 7 shows driving on asphalt+curve An exemplary embodiment of the invention is to be explained with the aid of FIG. 13. Sensors 1 for the wheel speeds $V_{Ri}$, 2 for the wheel cylinder pressure $P_i$ or the master brake cylinder pressure $P_{HB2}$, 3 for the steering angle $\delta$, and 4 for the yaw rate $\phi$ are provided.

With the aid of the measured variables $V_{Ri}$ and $P_i$ or $P_{HB2}$, the braking forces $F_{Bi}$ are determined in a block 5 in accordance with the relationship 3.3, and the longitudinal vehicle speed $V_L$ is obtained, for example, by means of the relationship 3.4. The terminals 5a are intended to indicate the input of the constants required to determine the variables.

The estimated variable $V_q$ (relationship 4.7) is determined in a further block 6 by means of the measured variables $\delta$ and $\phi$ and a Kalman filter contained there.

The terminals 6a are intended to indicate that the controller of FIG. 11 feeds the variables $C_V$ and $C_H$ via these.

The output variables of blocks 5 and 6, and the wheel speeds $V_{Ri}$ are fed to a block 7, which determines the attitude angles $\beta_V$ and $\beta_H$ in accordance with relationships 2.26, the wheel slips $\lambda_i$ in accordance with 2.27 and 2.28, the elastic steering angles $\delta_{Ei}$ in accordance with the relationships 2.10 to 2.13 and, finally, determines the slip angle $\alpha_i$ and/or the cornering forces $F_{Si}$, which it outputs at terminals 7a. Reference is also made here to FIG. 6 plus the associated description of German Patent Application P 40 30 704.2 corresponding to U.S. patent application Ser. No. 07/859,438.

We claim:

1. A method for increasing the controllability of a wheeled vehicle having a dynamic drive control system for controlling at least the brake pressure applied to the wheels, said method including the steps of:

determining the respective the wheel speeds $V_{Ri}$, where i=1, ... 4 and indicates the respective vehicle wheel, the steering angle $\delta$, the yaw rate $\rho$ and the respective wheel brake cylinder pressures $P_{Ri}$;

calculating the braking forces $F_{Bi}$ from the wheel brake pressures $P_{Ri}$ according the equation $$F_{Bi} = \frac{\theta R}{R^2} V_{Ri} + \frac{C_{Pi}}{R} P_{Ri},$$

where $\theta R$ is the amount of inertia of the wheel, $C_{Pi}$ is the braking ratio, and R is the radius of the wheel;

determining the longitudinal vehicle speed $V_L$ from the wheel speeds $V_{Ri}$ and from the deceleration of the vehicle;

estimating the vehicle transverse speed $V_q$ from the determined values for $\delta$ and $\rho$ using a Kalman Filter;

estimating the attitude angles $\beta_v$ and $\beta_v$ from the estimated value $V_q$ of said vehicle transverse speed $V_q$, according to the relationships $$\beta_V = \frac{V_q - l_1 \rho}{V_L} \text{ and } \beta_H = -\frac{V_q + l_2 \rho}{V_L},$$

where V and H indicate the front and rear, respectively, and where $l_1$ and $l_2$ are the respective lengths of the vehicle axles from the vehicle center of gravity; and determining the respective elastic steering angle values $\delta E_i$ from the calculated braking forces $F_{Bi}$;

determining the slip angles $\alpha_i$, using said estimated attitude angle values $\beta_V$ and $\beta_H$ and said respective elastic steering angle values $\delta E_i$, according to the relationships $\alpha_1 = \delta - \beta_V - \delta_{E1}$ $\alpha_2 = \delta - \beta_V - \delta_{E2}$ $\alpha_3 = \beta_H - \delta_{E3}$ $\alpha_4 = \beta_H - \delta_{E4}$ and, applying the determined slip angles $\alpha_i$ to the dynamic drive control system and utilizing the values $\alpha_i$ for controlling the brake pressure applied to the wheels.

2. Method according to claim 1, further comprising, additionally determining the tire normal forces $N_i$.

3. The method according to claim 1 wherein at least the wheel speeds $V_{Ri}$, the steering angle $\delta$ and the yaw rate $\rho$ are measured.

4. The method according to claim 3 wherein the wheel brake cylinder pressures $P_{Ri}$ are measured.

5. The method according to claim 3 wherein the master brake cylinder pressure is measured and the respective wheel brake pressures $P_{Ri}$ are determined from the measured master brake cylinder pressure.

6. The method according to claim 1 further comprising determining the cornering force $F_{si}$ on the respective wheels using the estimated attitude angle values $\beta_V$ and $\beta_H$ and the steering angle $\delta$; and applying the cornering forces $F_{si}$ to the dynamic drive control system to further improve the controllability of the vehicle.

* * * * *